(12) United States Patent
Yamanaka

(10) Patent No.: US 10,103,473 B2
(45) Date of Patent: Oct. 16, 2018

(54) ELECTRONIC APPARATUS TO WHICH ONE OR A PLURALITY OF CHILD UNITS ARE CONNECTED

(71) Applicant: FANUC CORPORATION, Yamanashi (JP)

(72) Inventor: Masashi Yamanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/287,737

(22) Filed: Oct. 7, 2016

(65) Prior Publication Data
US 2017/0104289 A1    Apr. 13, 2017

(30) Foreign Application Priority Data
Oct. 8, 2015 (JP) ................................. 2015-200044

(51) Int. Cl.
*H01R 13/453* (2006.01)
*H01R 13/52* (2006.01)
*G05B 11/01* (2006.01)

(52) U.S. Cl.
CPC .......... *H01R 13/453* (2013.01); *G05B 11/01* (2013.01); *H01R 13/4532* (2013.01); *H01R 13/5213* (2013.01)

(58) Field of Classification Search
CPC ............ H01R 13/4536; H01R 13/4532; H01R 13/453; H01R 13/4534
USPC ......................................... 439/135–139, 142
See application file for complete search history.

(56) References Cited

U.S. PATENT DOCUMENTS

| 5,267,870 | A  | * | 12/1993 | Maresh | H01R 13/4532 |
| | | | | | 174/67 |
| 6,305,956 | B1 | | 10/2001 | Deng | |
| 7,382,611 | B2 | * | 6/2008 | Tracy | G06F 1/1632 |
| | | | | | 361/679.41 |
| 7,438,567 | B2 | * | 10/2008 | Nalwad | H01R 13/4532 |
| | | | | | 439/137 |
| 7,980,869 | B1 | * | 7/2011 | Huang | H01R 13/4532 |
| | | | | | 439/137 |

FOREIGN PATENT DOCUMENTS

| GB | 434078 A | 8/1935 |
| JP | 2001-118638 A | 4/2001 |

* cited by examiner

*Primary Examiner* — Renee Iuebke
*Assistant Examiner* — Paul Baillargeon
(74) *Attorney, Agent, or Firm* — Hauptman Ham, LLP

(57) ABSTRACT

An electronic apparatus, including a parent unit connector to which a child unit connector of a child unit is connected includes a cutaway portion formed in an upper edge portion of the electronic apparatus, a connector cover covering the parent unit connector and having an end portion extending into the inside the cutaway portion, and a pivoting mechanism configured to cause the connector cover to pivot in a direction perpendicular to a direction in which the child unit connector of the child unit is connected to the parent unit connector.

6 Claims, 3 Drawing Sheets

ELECTRONIC APPARATUS TO WHICH ONE OR A PLURALITY OF CHILD UNITS ARE CONNECTED

RELATED APPLICATIONS

The present application claims priority to Japanese Patent Application Number 2015-200044 filed Oct. 8, 2015, the disclosure of which is hereby incorporated by reference herein in its entirety.

BACKGROUND OF THE INVENTION

1. Field of the Invention

The present invention relates to an electronic apparatus to which one or a plurality of child units is connected.

2. Description of the Related Art

An electronic apparatus serving as a parent unit includes one or a plurality of connectors to which one or a plurality of child units are to be respectively connected. For example, Japanese Laid-open Patent Publication No. 2001-118638 discloses a parent unit that includes a plurality of connectors.

SUMMARY OF INVENTION

However, not all of the plurality of child units may always be utilized, depending on an application installed by the user. Accordingly, some connectors may be left unused by the child units, depending on the application. The unused connectors are often left exposed, and therefore foreign objects may enter inside the connector, provoking a short circuit or contact failure.

In some cases, a protection cap is attached to cover an unused connector. In such a case, the user has to remove the protection cap before connecting a child unit to the connector. However, when the user attempts to connect the child unit without removing the protection cap, the connector may become damaged.

The present invention has been accomplished in view of the foregoing situation, and provides an electronic apparatus that prevents a user from failing to remove the protection cap at the time of connecting the child unit to the connector.

In a first aspect, the present invention provides an electronic apparatus including one or a plurality of parent unit connectors to each of which a child unit connector of one or a plurality of child units is to be connected. The electronic apparatus includes one or a plurality of cutaway portions formed in an upper edge portion of the electronic apparatus, one or a plurality of connector covers respectively covering the one or the plurality of parent unit connectors and each having one end portion extending into the inside of the one or the plurality of cutaway portions, and one or a plurality of pivoting mechanisms configured to cause the one or the plurality of connector covers to pivot in a direction perpendicular to a direction in which the child unit connector of the child unit is connected to the parent unit connector.

In a second aspect, the present invention provides the electronic apparatus of the first aspect, in which the one or the plurality of pivoting mechanisms each include a fulcrum that supports the connector cover with respect to the electronic apparatus, and a sloped portion formed on the one end portion of the connector cover in the cutaway portion.

In a third aspect, the present invention provides the electronic apparatus of the first or second aspect, further including one or a plurality of elastic members respectively connected to the one or the plurality of connector covers.

The objects, features and advantages of the present invention will become more apparent through detailed description of an exemplary embodiment of the present invention, given hereunder with reference to the accompanying drawings.

DETAILED DESCRIPTION

Figure 1:
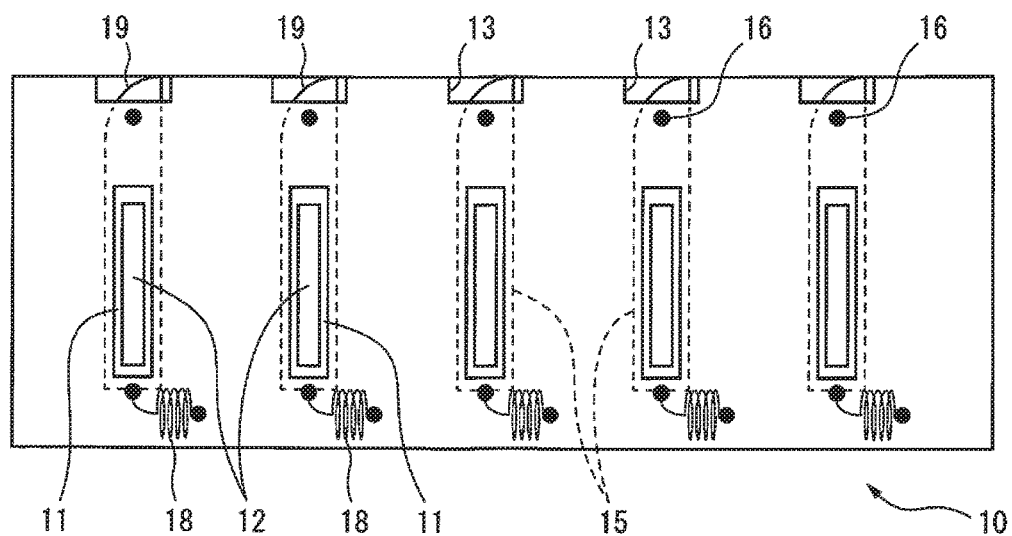
FIG. 1 is a side view illustrating an electronic apparatus according to the present invention.

Hereafter, the embodiment of the present invention will be described with reference to the accompanying drawings. In the drawings referred to hereunder, the same elements are given the same numerals. For clarity, the drawings are illustrated in different scales where appropriate.

FIG. 1 is a side view illustrating an electronic apparatus according to the present invention. As illustrated in FIG. 1, the electronic apparatus 10, herein exemplified by a parent unit, includes a plurality of openings 11 formed on a side face, and a parent unit connector 12 is located in each of the openings 11. The parent unit connector 12 depicted in FIG. 1 has an elongate shape.

In addition, a plurality of cutaway portions 13 are formed on an upper edge portion of the electronic apparatus 10, at positions respectively corresponding to the plurality of parent unit connectors 12. The cutaway portions 13 are each configured so as to be engaged with a projection 6 of a child unit 20 which will be subsequently described.

Further, each of the plurality of parent unit connectors 12 is covered with a connector cover 15, as indicated by broken lines in FIG. 1. As is apparent from FIG. 1, the connector cover 15 has an elongate shape so as to cover the parent unit connector 12, and is supported by a fulcrum 16 at a position close to an end portion of the connector cover 15, so as to pivot with respect to the electronic apparatus 10. An end portion of an elastic member, for example a spring 18, is connected to the other end portion of the connector cover 15. The other end portion of the spring 18 is fixed to the electronic apparatus 10.

As is apparent from FIG. 1, further, the first mentioned end portion of the connector cover 15 is formed as a sloped portion 19. The sloped portion 19 at least partially sticks out into the cutaway portion 13. The sloped portion 19 may be formed in a curved shape or a straight shape.

Figure 2:
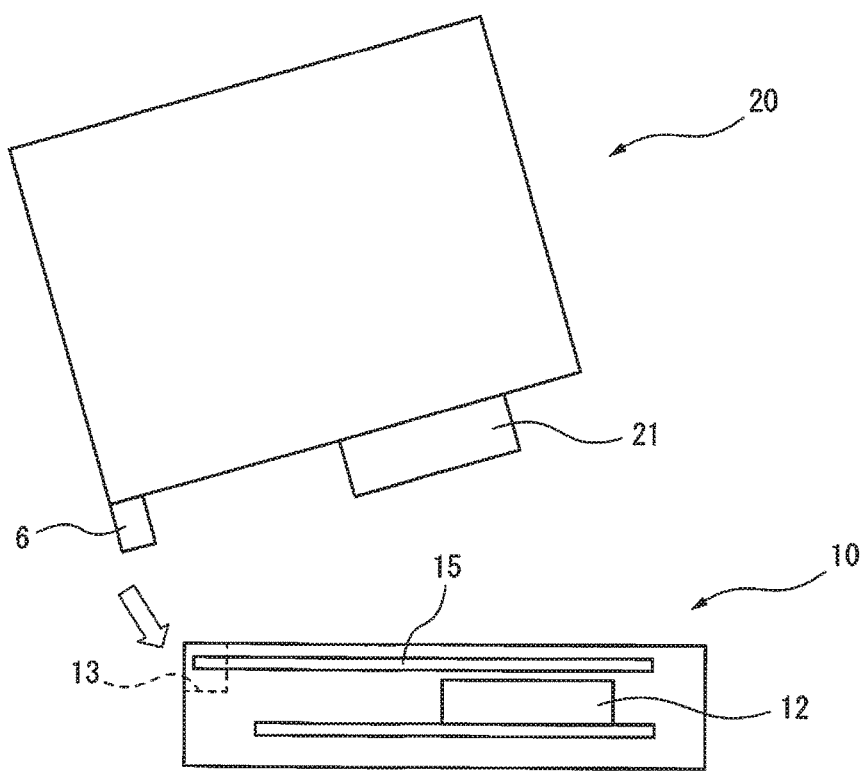
FIG. 2 is a schematic drawing illustrating a child unit about to be mounted on the electronic apparatus depicted in FIG. 1.

FIG. 2 is a schematic drawing illustrating the child unit about to be mounted on the electronic apparatus depicted in FIG. 1. As illustrated in FIG. 2, a child unit connector 21 and a projection 6 are provided in the lower end portion of the child unit 20. When the child unit 20 is connected to the electronic apparatus 10, the child unit 20 is tilted as illustrated, so that first the projection 6 of the child unit 20 is engaged with the cutaway portion 13 of the electronic apparatus 10. At the stage where the projection 6 of the child unit 20 starts to be engaged with the cutaway portion 13 of the electronic apparatus 10, the child unit connector 21 is still separated from the electronic apparatus 10.

Figure 3A:
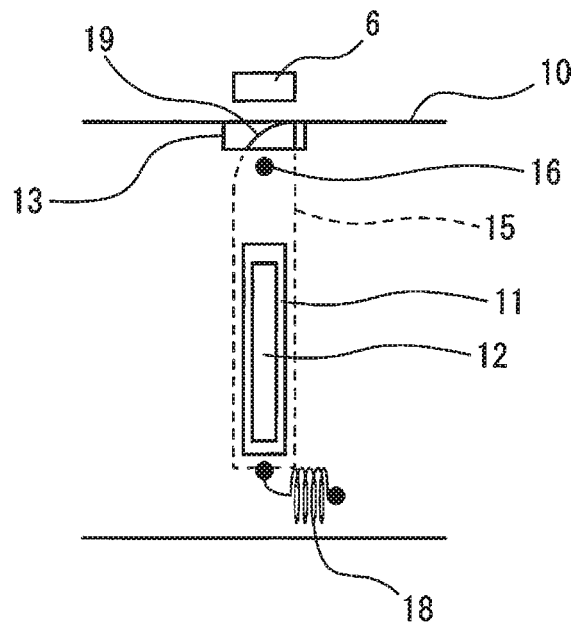
FIG. 3A is a first enlarged fragmentary side view of the electronic apparatus, to which the child unit is being mounted.
Figure 3B:
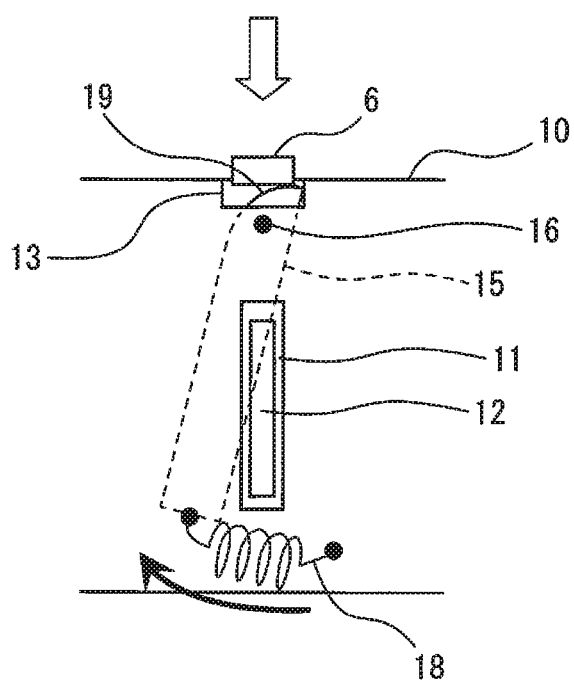
FIG. 3B is a second enlarged fragmentary side view of the electronic apparatus, to which the child unit is being mounted.
Figure 3C:
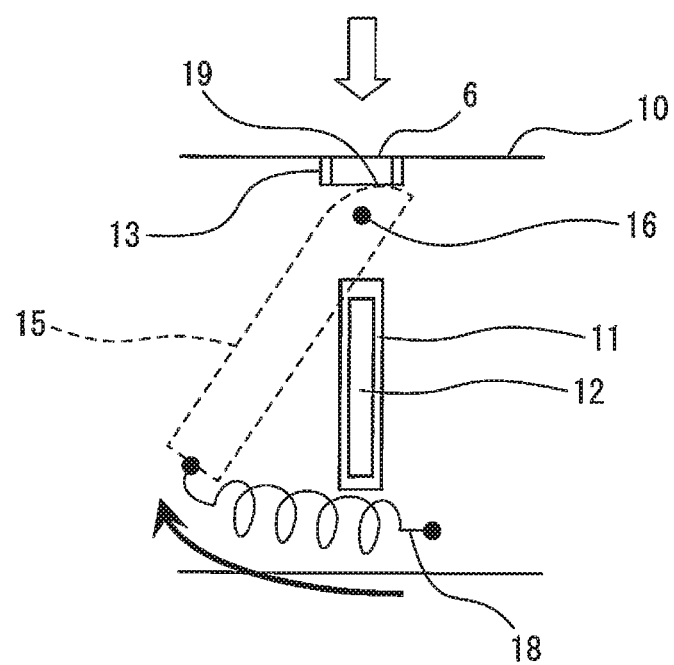
FIG. 3C is a third enlarged fragmentary side view of the electronic apparatus, to which the child unit is being mounted.

FIG. 3A to FIG. 3C are enlarged fragmentary views illustrating how the child unit is mounted. For the sake of clarity, the child unit 20 is excluded from FIG. 3A to FIG. 3C, except for the projection 6. As illustrated in FIG. 3A, the connector cover 15 is positioned so as to cover the parent unit connector 12, before the projection 6 of the child unit 20 is engaged with the cutaway portion 13.

When the projection 6 of the child unit 20 starts to be engaged with the cutaway portion 13, the leading end of the projection 6 presses the sloped portion 19 of the connector cover 15 in the cutaway portion 13, as illustrated in FIG. 3B. Therefore, the connector cover 15 is caused to pivot about the fulcrum 16 according to the inclination direction of the sloped portion 19, along a surface of the electronic apparatus 10. The pivoting direction of the connector cover 15 is perpendicular to the direction in which the parent unit connector 12 and the child unit connector 21 are connected to each other. Therefore, the connector cover 15 partially opens the parent unit connector 12. In addition, the spring 18 is expanded as illustrated in FIG. 3B, owing to the pivoting motion of the connector cover 15.

When the projection 6 of the child unit 20 is fully engaged with the cutaway portion 13, the connector cover 15 opens the entirety of the parent unit connector 12, as illustrated in FIG. 3C. Therefore, the child unit connector 21 can be connected to the parent unit connector 12 of the electronic apparatus 10, which is now exposed. In this regard, the spring 18 urges the connector cover 15 to return to the position depicted in FIG. 3A. However, since the child unit connector 21 is now connected to the parent unit connector 12, the connector cover 15 remains at the position depicted in FIG. 3C.

Therefore, the electronic apparatus 10 can be utilized, with the child unit 20 connected thereto. This also applies to connecting one or a plurality of other child units 20. As illustrated in FIG. 1, the parent unit connectors 12 are spaced from each other at predetermined intervals. Accordingly, when the connector cover 15 is caused to pivot as illustrated in FIG. 3C, the connector cover 15 is kept from interfering with the adjacent parent unit connector 12. Therefore, the child units 20 can be connected to all of the plurality of parent unit connectors 12 of the electronic apparatus 10.

As described above, in this embodiment the connector cover 15 is positioned so as to cover the parent unit connector 12 when the child unit 20 is not connected (see FIG. 3A), and therefore a short circuit or contact failure due to the intrusion of foreign objects can be prevented. When the child unit 20 is connected, the connector cover 15 is caused to pivot in linkage with the connecting motion of the child unit 20, so as to open the parent unit connector 12 as illustrated in FIG. 3B and FIG. 3C. Therefore, unlike the conventional apparatuses, the configuration according to this embodiment prevents a user from failing to remove the protection cap, thereby preventing the parent unit connector 12 from becoming damaged.

In the foregoing embodiment described with reference to the drawings, the connector cover 15 includes the sloped portion 19. Therefore, the sloped portion 19 and the fulcrum 16 act as a pivoting mechanism that causes the connector cover 15 to pivot about the fulcrum 16 when the projection 6 of the child unit 20 is introduced into the cutaway portion 13 of the electronic apparatus 10. However, a differently configured pivoting mechanism may be adopted to cause the connector cover 15 to pivot. For example, an additional small protruding portion may be formed on the tip portion of the projection 6, so as to press the end face of the connector cover 15 with the protruding portion, thus to cause the connector cover 15 to pivot. In this case, the sloped portion 19 can be excluded from the connector cover 15.

When the child unit 20 is detached from the electronic apparatus 10, the child unit connector 21 is disconnected from the parent unit connector 12 by tilting the child unit 20 as described earlier. By doing so, the connector cover 15 is automatically caused to return to the initial position depicted in FIG. 3A, by the spring 18. Therefore, the parent unit connector 12 is again covered with the connector cover 15, thus to be protected from intrusion of foreign objects into the parent unit connector 12.

ADVANTAGEOUS EFFECTS OF INVENTION

With the configuration according to the first aspect, the connector cover is positioned so as to cover the parent unit connector when the child unit is not connected, and therefore a short circuit or contact failure due to intrusion of foreign objects can be prevented. In addition, when the child unit is connected, the connector cover is caused to pivot in linkage with the connecting motion of the child unit. Therefore, failure to remove a protection cap can be prevented, and the connector can be prevented from becoming damaged.

With the second aspect, the pivoting mechanism can be formed with a relatively simple structure.

In the third aspect, an elastic member, for example a spring, is provided. Therefore, the connector cover automatically returns to the initial position after the child unit is detached, thus to again cover the parent unit connector.

Although the present invention has been described with reference to an exemplary embodiment, it is obvious to persons skilled in the art that the aforementioned modification, as well as various other modifications, exclusions, and additions may be made without departing from the scope of the present invention.

The invention claimed is:
1. An electronic apparatus, comprising:
a plurality of openings formed in a face of the electronic apparatus;
a plurality of parent unit connectors to each of which a child unit connector of a child unit among a plurality of child units is to be connected, wherein each parent unit connector among the plurality of parent unit connectors is located in a corresponding opening among the plurality of openings;
a plurality of cutaway portions formed in an upper edge portion of the electronic apparatus, wherein the plurality of cutaway portions are distinct from the plurality of openings;
a plurality of connector covers respectively covering the plurality of parent unit connectors, each connector cover among the plurality of connector covers having one end portion extending into an inside of a corresponding cutaway portion among the plurality of cutaway portions; and
a plurality of pivoting mechanisms each configured to cause a corresponding connector cover among the plurality of connector covers to pivot in a direction perpendicular to a direction in which the child unit connector of a child unit among the plurality of child units is to be connected to a parent unit connector among the plurality of parent unit connectors.

2. The electronic apparatus according to claim 1, wherein each pivoting mechanism among the plurality of pivoting mechanisms includes:
   a fulcrum that supports the corresponding connector cover with respect to the electronic apparatus, and
   a sloped portion formed on the one end portion of the corresponding connector cover in the corresponding cutaway portion.

3. The electronic apparatus according to claim 1, further comprising:
   a plurality of elastic members respectively connected to the plurality of connector covers.

4. The electronic apparatus according to claim 2, wherein
   the sloped portion of each connector cover among the plurality of connector covers is configured to be directly engaged by a projection of a child unit among the plurality of child units when the projection of the child unit enters the corresponding cutaway portion, and
   the connector cover is pivotable, by the direct engagement between the sloped portion and the projection of the child unit and by further movement of the projection into the corresponding cutaway portion, about the corresponding fulcrum to uncover the corresponding parent unit connector for subsequent connection of the uncovered parent unit connector with the child unit connector of the child unit.

5. The electronic apparatus according to claim 1, wherein when each connector cover among the plurality of connector covers a corresponding parent unit connector among the plurality of parent unit connectors, said each connector cover has
   the one end portion exposed in the corresponding cutaway portion,
   an opposite end portion exposed in a corresponding opening among the plurality of openings while covering the corresponding parent unit connector, and
   a middle portion between the one end portion and the opposite end portion, said middle portion being covered by a portion of said face of the electronic apparatus.

6. An electronic apparatus, comprising:
   a plurality of parent unit connectors to each of which a child unit connector of a child unit among a plurality of child units is to be connected;
   a plurality of cutaway portions formed in an upper edge portion of the electronic apparatus;
   a plurality of connector covers respectively covering the plurality of parent unit connectors, each connector cover among the plurality of connector covers having one end portion extending into an inside of a corresponding cutaway portion among the plurality of cutaway portions; and
   a plurality of pivoting mechanisms each configured to cause a corresponding connector cover among the plurality of connector covers to pivot in a direction perpendicular to a direction in which the child unit connector of a child unit among the plurality of child units is to be connected to the parent unit connector,
   wherein
   each pivoting mechanism among the plurality of pivoting mechanisms includes:
      a fulcrum that supports the corresponding connector cover with respect to the electronic apparatus, and
      a sloped portion formed on the one end portion of the corresponding connector cover in the corresponding cutaway portion,
   the sloped portion of each connector cover among the plurality of connector covers is configured to be directly engaged by a projection of a child unit among the plurality of child units when the projection of the child unit enters the corresponding cutaway portion,
   the connector cover is pivotable, by the direct engagement between the sloped portion and the projection of the child unit and by further movement of the projection into the corresponding cutaway portion, about the corresponding fulcrum to uncover the corresponding parent unit connector for subsequent connection of the uncovered parent unit connector with the child unit connector of the child unit, and
   each cutaway portion among the plurality of cutaway portions extends inwardly from a side edge of the electronic apparatus.

* * * * *